United States Patent
Wu et al.

(10) Patent No.: US 10,356,296 B2
(45) Date of Patent: Jul. 16, 2019

(54) LIGHT GUIDE FOR FINGER PRINT READER

(71) Applicant: Gingy Technology Inc., Hsinchu (TW)

(72) Inventors: Chien-Hsing Wu, Hsinchu (TW); Cheng-Jyun Huang, Hsinchu (TW); Po-Hsun Shen, Hsinchu (TW)

(73) Assignee: Gingy Technology Inc., Hsinchu (TW)

( * ) Notice: Subject to any disclaimer, the term of this patent is extended or adjusted under 35 U.S.C. 154(b) by 136 days.

(21) Appl. No.: 15/399,704

(22) Filed: Jan. 5, 2017

(65) Prior Publication Data

US 2018/0041674 A1     Feb. 8, 2018

Related U.S. Application Data

(60) Provisional application No. 62/413,974, filed on Oct. 27, 2016, provisional application No. 62/371,230, filed on Aug. 5, 2016.

(30) Foreign Application Priority Data

Nov. 4, 2016 (TW) .............................. 105135846 A

(51) Int. Cl.
*F21V 8/00* (2006.01)
*H04N 5/225* (2006.01)

(52) U.S. Cl.
CPC ........... *H04N 5/2256* (2013.01); *G02B 6/009* (2013.01); *G02B 6/0018* (2013.01); *H04N 5/2253* (2013.01); *H04N 5/2254* (2013.01)

(58) Field of Classification Search
None
See application file for complete search history.

(56) References Cited

U.S. PATENT DOCUMENTS

| 5,177,802 A | 1/1993 | Fujimoto et al. |
| 6,927,844 B2 | 8/2005 | Higuchi et al. |
| (Continued) | | |

FOREIGN PATENT DOCUMENTS

| CN | 1820272 | 8/2006 |
| TW | 200825943 | 6/2008 |
| (Continued) | | |

OTHER PUBLICATIONS

"Office Action of Taiwan Counterpart Application," dated Dec. 17, 2017, p. 1-p. 9.

*Primary Examiner* — Jayanti K Patel
*Assistant Examiner* — Shadan E Haghani
(74) *Attorney, Agent, or Firm* — JCIPRNET

(57) ABSTRACT

An image capture apparatus including a light guide device, a transparent device, a light source and an image capture device is provided. The light guide device includes a top surface, a bottom surface opposite to the top surface, a light incident surface connected between the top surface and the bottom surface and a light emitting surface opposite to the top surface. The bottom surface is connected between the light incident surface and the light emitting surface. An acute angle α is included between the light incident surface and the top surface. The transparent device is disposed on the top surface of the light guide device. The light source is used to emit a light beam. The image capture device is disposed on the light emitting surface of the light guide device.

12 Claims, 5 Drawing Sheets

(56) References Cited

U.S. PATENT DOCUMENTS

| | | | |
|---|---|---|---|
| 9,830,498 B2* | 11/2017 | Pan | G06K 9/00006 |
| 2003/0206287 A1* | 11/2003 | McClurg | G06K 9/00046 |
| | | | 356/71 |
| 2016/0117543 A1 | 4/2016 | Huang et al. | |
| 2016/0247010 A1* | 8/2016 | Huang | G02B 5/20 |
| 2016/0292491 A1* | 10/2016 | Dickerson | G06K 9/00046 |
| 2017/0372114 A1* | 12/2017 | Cho | G01J 1/0219 |

FOREIGN PATENT DOCUMENTS

| | | |
|---|---|---|
| TW | 201419165 | 5/2014 |
| TW | I444904 | 7/2014 |
| TW | I517054 | 1/2016 |

* cited by examiner

LIGHT GUIDE FOR FINGER PRINT READER

CROSS-REFERENCE TO RELATED APPLICATION

This application claims the priority benefits of U.S. provisional application Ser. No. 62/371,230, filed on Aug. 5, 2016, U.S. provisional application Ser. No. 62/413,974, filed on Oct. 27, 2016, and Taiwan application serial no. 105135846, filed on Nov. 4, 2016. The entirety of each of the above-mentioned patent applications is hereby incorporated by reference herein and made a part of this specification.

BACKGROUND

Field of the Invention

The invention is directed to an image capture apparatus.

Description of Related Art

The types of biometrics include face, voice, iris, retina, vein, and fingerprint identifications. Since each person's fingerprints are unique, and the fingerprints are not easy to change with age or health status, a fingerprint recognition apparatus has become the most popular biometric apparatus at present. According to different sensing methods, the fingerprint recognition apparatus may be further divided into an optical type, a capacitive type, an ultrasonic type, a thermal-sensing type, etc.

The optical-type fingerprint recognition apparatus can be used to capture a fingerprint image by means of total reflection, of which the working principle is as follows. A fingerprint is composed of multiple irregular convex parts (i.e., ridges) and concave parts (i.e., valleys). When a finger presses the fingerprint recognition apparatus, the convex parts contact a transparent device of the fingerprint recognition apparatus, while the concave parts do not contact the transparent device of the fingerprint recognition apparatus. The convex parts contacting the transparent device destroys the total reflection of a light beam in the transparent device, so as to induce an image capture device to obtain dark lines corresponding to the convex parts of the fingerprint. In the meantime, the concave parts of the fingerprint does not destroy the total reflection of the light beam in the transparent device, so as to induce the image capture device to obtain bright lines corresponding to the convex parts of the fingerprint. Thereby, the light beam corresponding to the convex and the concave parts of the fingerprint form a bright and dark striped pattern on a light receiving surface of the image capture device for the image capture device to obtain a fingerprint image. The user's identity can then be identified by means of calculating information corresponding to the fingerprint image by using an algorithm. However, in the conventional technique, the fingerprint recognition apparatus operating based on the principle of total reflection has a disadvantage of large size, which is unfavorable for being installed in various electronic products (e.g., mobile phones, tablet computers, notebook computers).

SUMMARY

The invention provides an image capture apparatus with a small size and preferable image capturing quality.

According to an embodiment of the invention, an image capture apparatus including a light guide device, a transparent device, a light source and an image capture device is provided. The light guide device includes a top surface, a bottom surface opposite to the top surface, a light incident surface connected between the top surface and the bottom surface and a light emitting surface opposite to the top surface. The bottom surface is connected between the light incident surface and the light emitting surface. An acute angle $\alpha$ is included between the light incident surface and the top surface. The transparent device is disposed on the top surface of the light guide device. The light source is used to emit a light beam. The light beam passing through the light incident surface is transmitted toward the transparent device and totally reflected by an interface between the transparent device and an environment medium. The image capture device is disposed on the light emitting surface of the light guide device.

According to another embodiment of the invention, an image capture apparatus including a light guide device, a transparent device, a light source, an image capture device, a first reflection device and a second reflection device is provided. The light guide device includes a top surface, a bottom surface opposite to the top surface, a light incident surface connected between the top surface and the bottom surface and a light emitting surface opposite to the top surface. The bottom surface is connected between the light incident surface and the light emitting surface. The transparent device is disposed on the top surface of the light guide device. The light source is used to emit a light beam. The image capture device is disposed on the light emitting surface of the light guide device. The first reflection device is disposed on the top surface of the light guide device and located between the transparent device and the light guide device. The second reflection device is disposed on the bottom surface of the light guide device. The light beam passing through the light incident surface is reflected by the first reflection device and the second reflection device. The light beam reflected by the first reflection device and the second reflection device is totally reflected by an interface between the transparent device and an environment medium.

To sum up, the image capture apparatus provided by one of the embodiments of the invention includes the light guide device, the transparent device disposed on the top surface of the light guide device, the light source disposed beside the light incident surface of the light device and the image capture device disposed on the light emitting surface of the light guide device. The light incident surface of the light guide device is inclined with respect to the top surface of the light guide device, and the acute angle $\alpha$ is included between the top surface and the light incident surface of the light guide device. With the inclined light incident surface (i.e., the design of the acute angle $\alpha$), the light beam emitted by the light source can be totally reflected by the interface between the transparent device and the environment medium within a short distance. In this way, the size of the image capture apparatus can be reduced, which is favorable for being installed in various electronic products.

Moreover, the image capture apparatus provided by another embodiment of the invention includes the light guide device, the transparent device, the light source, the image capture device, the first reflection device and the second reflection device. The transparent device is disposed on the top surface of the light guide device. The image capture device is disposed on the light emitting surface of the light guide device. The second reflection device is disposed on the bottom surface of the light guide device. The second reflection device is disposed on the bottom surface of the light guide device. The image capture device can capture a complete object image by using the light receiving surface with a small area. In other words, an area of the image capture device can be reduced through a beam expansion effect achieved by the first reflection device and the second reflection device and adjustment of a position of the image capture device, and a size of the image capture apparatus including the image capture device can be reduced as well.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
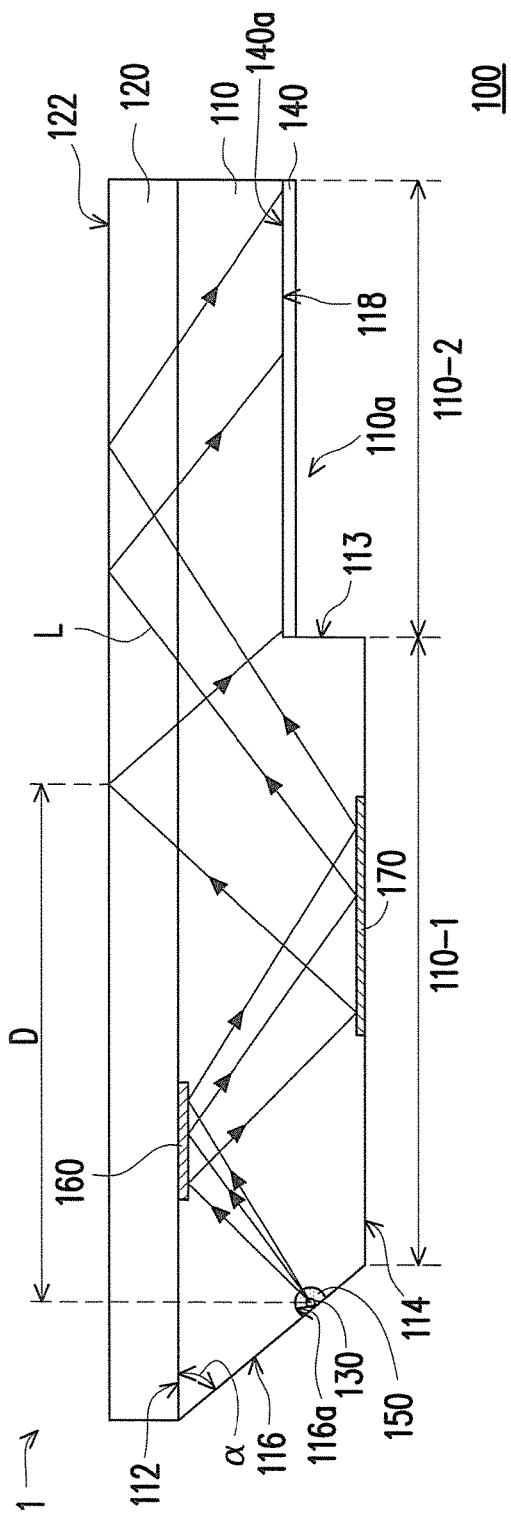
FIG. 1 is a schematic sectional view of an image capture apparatus according to an embodiment of the invention.
Figure 2:
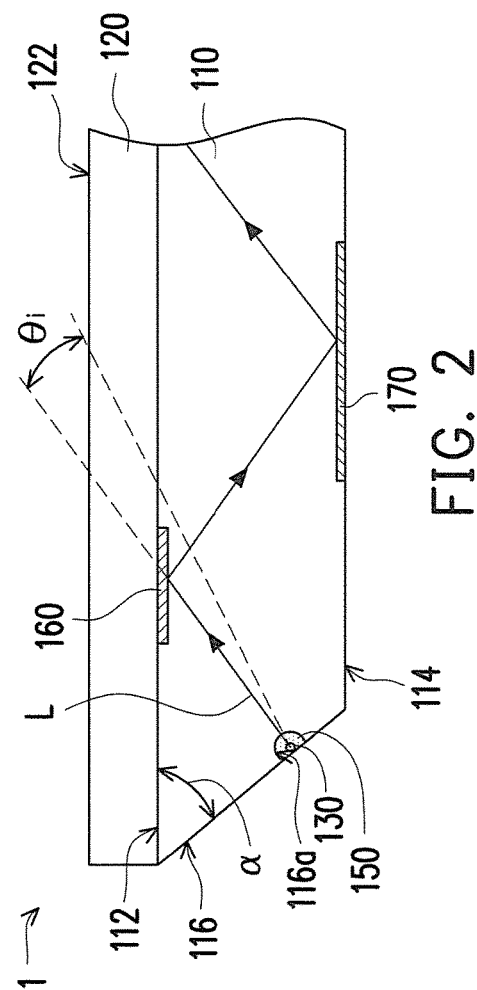
FIG. 2 is a schematic view of a part of the image capture apparatus according to an embodiment of the invention.

FIG. 1 is a schematic sectional view of an image capture apparatus according to an embodiment of the invention. FIG. 2 is a schematic view of a part of the image capture apparatus according to an embodiment of the invention. Referring to FIG. 1 and FIG. 2, an image capture apparatus 100 is located in an environment medium 1. In the present embodiment, the environment medium 1 is, for example, air. However, the invention is not limited thereto, and in another embodiment, the image capture apparatus 100 may also be located in another type of environment medium. The image capture apparatus 100 is used to capture an image of an object. In a normal condition, the object refers to a biological feature, e.g., a fingerprint, but the invention is not limited thereto.

The image capture apparatus 100 includes a light guide device 110. The light guide device 110 includes a top surface 112, a bottom surface 114 opposite to the top surface 112, a light incident surface 116 connected between the top surface 112 and the bottom surface 114 and a light emitting surface 118. The light emitting surface 118 is opposite to the top surface 112. The bottom surface 114 is connected between the light incident surface 116 and the light emitting surface 118. Specially, the light incident surface 116 is inclined with respect to the top surface 112, and an acute angle α is included between the light incident surface 116 and the top surface 112.

In the present embodiment, the light guide device 110 further includes an inner wall 113. The light emitting surface 118 is more adjacent to a transparent device 120 than the bottomsurface 114. The inner wall 113 is connected between the bottom surface 114 and the light emitting surface 118. A recess 110a is formed by the inner wall 113 and the light emitting surface 118. In other words, the light guide device 110 includes a thick portion 110-1 having the bottom surface 114 and a thin portion 110-2 having the light emitting surface 118. In the present embodiment, the light emitting surface 118 and the bottom surface 114 may be selectively parallel to the top surface 110, but the invention is not limited thereto, and in another embodiment, the light emitting surface 118 may also be inclined with respect to the top surface 110, which will be described with reference to other drawings below.

The image capture apparatus 100 includes the transparent device 120. The transparent device 120 is disposed on the top surface 112 of the light guide device 110. In the present embodiment, the transparent device 120 may be fixed onto the top surface 112 of the light guide device 110 through an optical adhesive (not shown). A material of the light guide device 110 and/or a material of the transparent device 120 may be selected form glass, polymethylmethacrylate (PMMA), polycarbonate (PC) or other suitable transparent materials. In the present embodiment, refractive indices of the light guide device 110, the optical adhesive and the transparent device 120 may be the same or similar, but the invention is not limited thereto.

The image capture apparatus 100 includes a light source 130. The light source 130 is disposed beside the light incident surface 116 and used to emit a light beam L. In the present embodiment, the light incident surface 116 of the light guide device 110 has a recess 116a. The light source 130 is disposed in the recess 116a. The image capture apparatus 100 further includes an optical adhesive 150. The optical adhesive 150 is filled in the recess 116a to cover the light source 130 and connect the light source 130 and the light guide device 110. In the present embodiment, a refractive index of the optical adhesive 150 may by the same as or similar to the refractive index of the light guide device 110 to reduce loss of the light beam L before entering the light guide device 110, but the invention is not limited thereto. In the present embodiment, the light beam L is, for example, invisible light. Thereby, when an electronic product equipped with the image capture apparatus 100 is used to capture the object image, the light beam L does not influence the appearance of the electronic product. However, the invention is not limited thereto, and in another embodiment, the light beam L may also be visible light or a combination of visible light and invisible light. In the present embodiment, the light source 130 is a light emitting diode (LED), but the invention is not limited thereto, and in another embodiment, the light source may also be other suitable light emitting devices.

The image capture apparatus 100 includes an image capture device 140. The image capture device 140 is disposed on the light emitting surface 118 of the light guide device 110. A light receiving surface 140a of the image capture device 140 faces the light emitting surface 118 of the light guide device 110. In the present embodiment, the image capture device 140 is supported on the light emitting surface 118 of the light guide device 110, and the light receiving surface 140a of the image capture device 140 may be substantially parallel to the light emitting surface 118 of the light guide device 110. The image capture device 140 is, for example, a charge coupled device (CCD) or a complementary metal-oxide semiconductor (CMOS), but the invention is not limited thereto, and in another embodiment, the light source 140 may also be other suitable image sensors.

Referring to FIG. 1 and FIG. 2, the light beam L passing through the light incident surface 116 is transmitted toward the transparent device 120, and at least a part of the light beam L is totally reflected by an interface 122 between the transparent device 120 and the environment medium 1. When the object (e.g., convex parts of the fingerprint) contact the interface 122, the total reflection of the light beam L on a part of the interface 122 corresponding to the convex parts of the fingerprint may be destroyed, which leads the image capture device 140 to obtain dark lines corresponding to the convex parts of the fingerprint. Concave parts of the fingerprint does not contact the interface 122 while the convex parts of the fingerprint contact the part of the interface 122, and the total reflection of the light beam L on another part of the interface 122 corresponding to the concave parts of the fingerprint is not destroyed, which leads the image capture device 140 to obtain bright lines corresponding to the concave parts of the fingerprint. In this way, the image capture device 140 may obtain a bright and dark object image (e.g., a fingerprint image).

It should be noted that with the inclined light incident surface 116 (i.e., the design of the acute angle α), the light beam L emitted by the light source 130 may be totally reflected by the interface 122 between the transparent device 120 and the environment medium 1 within a short distance D. In this way, the size of the image capture apparatus 100 may be reduced, which is favorable for being installed in various electronic products. In the present embodiment, the size of the acute angle α may be adaptively designed, and thereby, a ratio of the total reflection of the light beam L occurring on the interface 122 may be further increased in a premise that the size of the image capture apparatus 100 is reduced. For example, in the present embodiment, the acute angle α satisfies the following formula (1):

$$\theta_i \le \alpha - \sin^{-1}\left(\frac{n_1}{n_2}\right), \quad (1)$$

wherein $\theta_i$ is an incident angle of the light beam L entering the light guide device 110 through the light incident surface 116, $n_1$ is a refractive index of the environment medium 1, and $n_2$ is the refractive index of the light guide device 110. $\theta_i$ is negative if a direction from a normal line (e.g., the dotted line illustrated in FIG. 2 which is not parallel to the light beam L) of the light incident surface 116 to the light beam L is clockwise. $\theta_i$ is positive if the direction from the normal line (e.g., the dotted line illustrated in FIG. 2 which is not parallel to the light beam L) of the light incident surface 116 to the light beam L is counterclockwise. When the angle α satisfies the formula (1), the ratio of the total reflection of the light beam L occurring on the interface 122 is increased, which facilitates enhancing image capturing quality of the image capture apparatus 100.

Referring to FIG. 1, in the present embodiment, the image capture apparatus 100 may further include a first reflection device 160 and a second reflection device 170. The first reflection device 160 is disposed on the top surface 112 of the light guide device 110 and located between the transparent device 120 and the light guide device 110. The second reflection device 170 is disposed on the bottom surface 114 of the light guide device 110. The light beam L passing through the light incident surface 116 is sequentially reflected by the first reflection device 160 and the second reflection device 170 and expanded. The expanded light beam L is transmitted toward the transparent device 120 and totally reflected by the interface 122 between the transparent device 120 and the environment medium L. The image capture device 140 is disposed more adjacently to the transparent device 120 than the second reflection device 110 (for example, in the recess 110*a*).

It should be noted that with the beam expansion effect achieved by the first reflection device 160 and the second reflection device 170 and adjustment of a position of the image capture device (for example, the light receiving surface 140*a* of the image capture device 140 is configured to be adjacent to the transparent device 120, or the light receiving surface 140*a* of the image capture device 140 is configured to be inclined with respect to the top surface 112), the image capture device 140 may capture a complete object image (e.g., a fingerprint image) by using the light receiving surface 140*a* with a small area. In other words, the area of the image capture device 140 can be reduced, and the size of the image capture apparatus 100 including the image capture device 140 may be further reduced. However, the invention is not limited thereto, and in another embodiment, the image capture apparatus 100 may not have to include the first reflection device 160 and the second reflection device 170, which will be described with reference to other drawings below.

Figure 3:
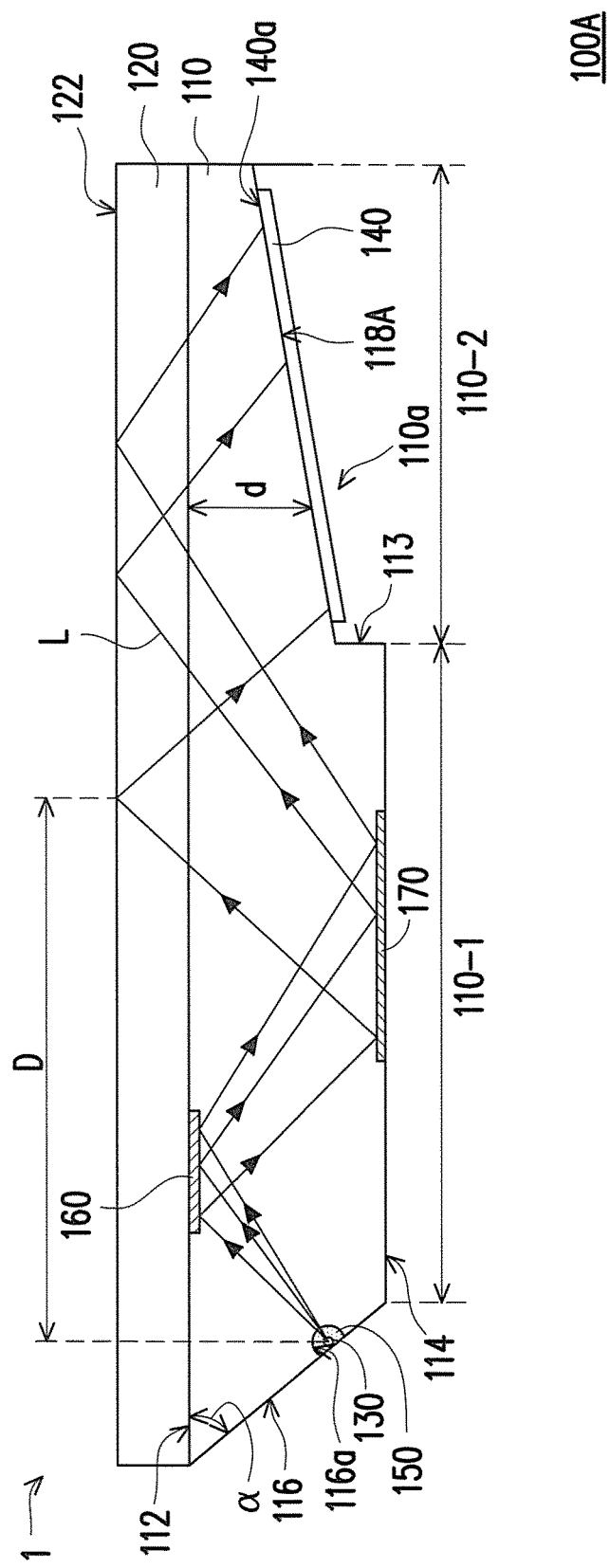
FIG. 3 is a schematic sectional view of an image capture apparatus according to another embodiment of the invention.

FIG. 3 is a schematic sectional view of an image capture apparatus according to another embodiment of the invention. Referring to FIG. 3, an image capture apparatus 100A of the present embodiment is similar to the image capture apparatus 100 described above, and thus, the same or corresponding elements are labeled by the same or corresponding numerals. The difference between the image capture apparatus 100A and the image capture apparatus 100 lies in a light emitting surface 118A of the image capture apparatus 100A being different from that of the image capture apparatus 100. The difference will be described below, and the same or corresponding parts may refer to the description above.

Referring to FIG. 3, the image capture apparatus 100A includes the light guide device 110, the transparent device 120, the light source 130 and the image capture device 140. The light guide device 110 includes the top surface 112, the bottom surface 114 opposite to the top surface 112, the light incident surface 116 connected between the top surface 112 and the bottom surface 114 and the light emitting surface 118A. The light emitting surface 118A is opposite to the top surface 112. The bottom surface 114 is connected between the light incident surface 116 and the light emitting surface 118A. An acute angle α is included between the light incident surface 116 and the top surface 112. The transparent device 120 is disposed on the top surface 112 of the light guide device 110. The light source 130 is disposed beside the light incident surface 116 and used to emit the light beam L. The light beam L passing through the light incident surface 116 is transmitted toward the transparent device 120 and totally reflected by the interface 122 between the transparent device 120 and the environment medium 1. The image capture device 140 is disposed on the light emitting surface 118A of the light guide device 110.

Being different from that of the image capture apparatus 100, the light emitting surface 118A of the image capture apparatus 100A is inclined with respect to the top surface 112 and the bottom surface 114, and a distance d between the top surface 112 and the light emitting surface 118A is gradually decreased as being far away from the light source 130. The image capture device 140 is supported on the light emitting surface 118A, and the light receiving surface 140a of the image capture device 140 may be substantially parallel to the light emitting surface 118A of the light guide device 110. The light receiving surface 140a of the image capture device 140 is also inclined with respect to the top surface 112 and the bottom surface 114. In addition to the effects and advantages of the image capture apparatus 100, the image capture apparatus 100A may also achieve reducing a probability of stray light entering the image capture device 140 with the inclined image capture device 140, so as to enhance quality of capturing the object image, for example, enhance a contrast of the object image.

Figure 4:
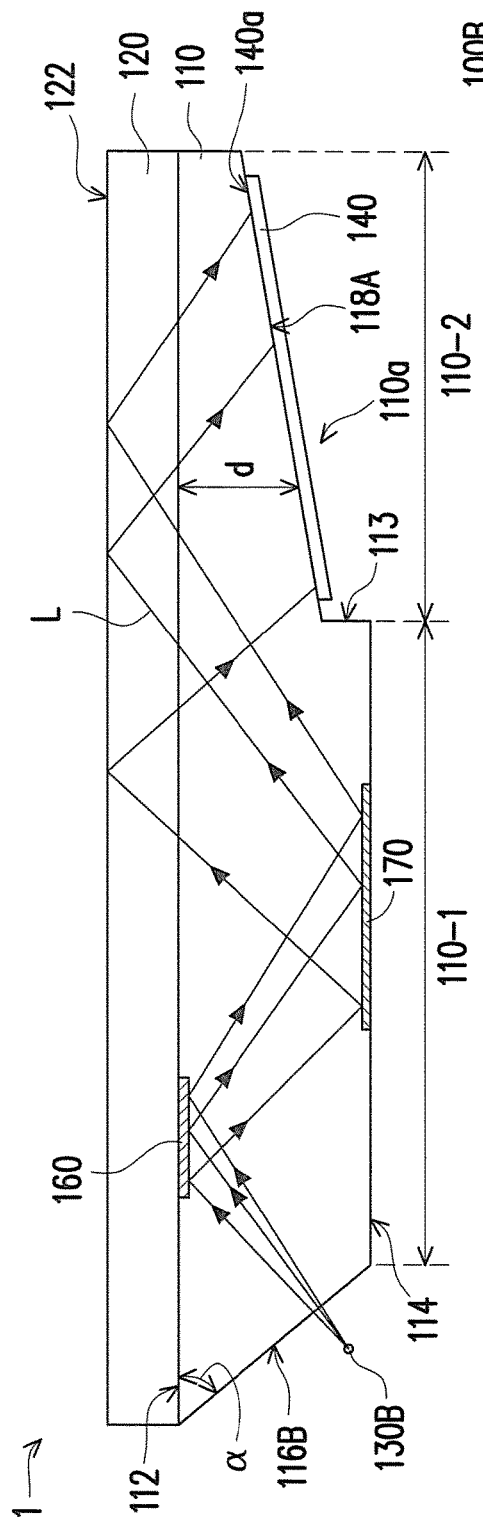
FIG. 4 is a schematic sectional view of an image capture apparatus according to yet another embodiment of the invention.
Figure 5:
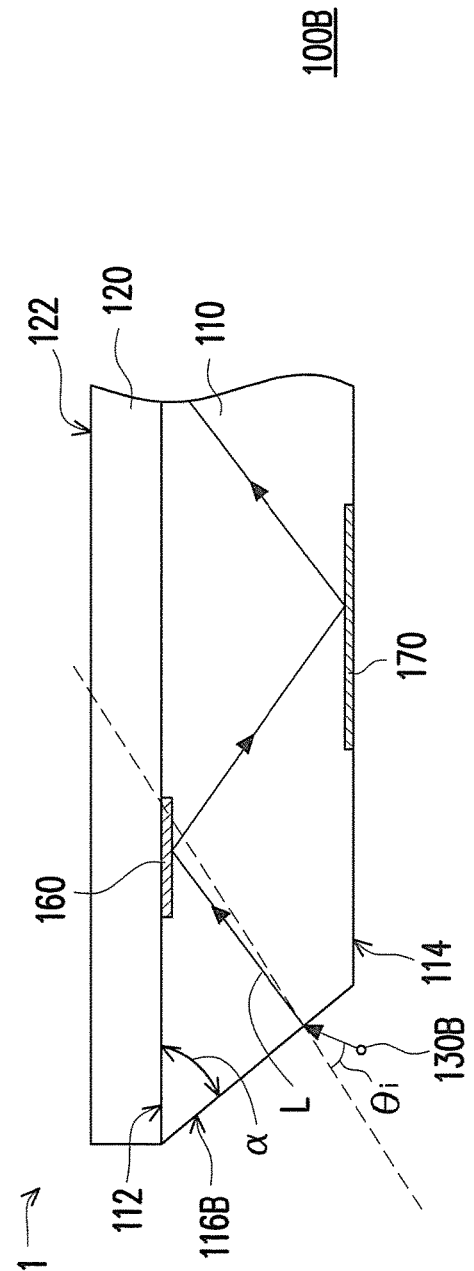
FIG. 5 is a schematic view of a part of the image capture apparatus according to yet another embodiment of the invention.

FIG. 4 is a schematic sectional view of an image capture apparatus according to yet another embodiment of the invention. FIG. 5 is a schematic view of a part of the image capture apparatus according to yet another embodiment of the invention. Referring to FIG. 4 and FIG. 5, an image capture apparatus 100B of the present embodiment is similar to the image capture apparatus 100A described above, and thus, the same or corresponding elements are labeled by the same or corresponding numerals. The difference between the image capture apparatus 100B and the image capture apparatus 100A lies in a light source 130B being disposed outside the light guide device 110 and located in the environment medium 1. The difference will be described below, and the same or corresponding parts may refer to the description above.

Referring to FIG. 4 and FIG. 5, the image capture apparatus 100B includes the light guide device 110, the transparent device 120, the light source 130B and the image capture device 140. The light guide device 110 includes the top surface 112, the bottom surface 114 opposite to the top surface 112, a light incident surface 116B connected between the top surface 112 and the bottom surface 114 and the light emitting surface 118A. The light emitting surface 118A is opposite to the top surface 112. The bottom surface 114 is connected between the light incident surface 116B and the light emitting surface 118A. An acute angle α is included between the light incident surface 116B and the top surface 112. The transparent device 120 is disposed on the top surface 112 of the light guide device 110. The light source 130B is disposed beside the light incident surface 116 and used to emit the light beam L. The light beam L passing through the light incident surface 116B is transmitted toward the transparent device 120 and totally reflected by the interface 122 between the transparent device 120 and the environment medium 1. The image capture device 140 is disposed on the light emitting surface 118A of the light guide device 110.

Being different from that of the image capture apparatus 100A, the light incident surface 116B of the image capture apparatus 100B does not have the recess 116a, and the light source 130B is disposed outside the light guide device 110 and located in the environment medium 1. In other words, the light beam L emitted by the light source 130B has to be transmitted for a distance in the environment medium 1 and then, enters the light guide device 110 through the light incident surface 116B. As the transmission path of the light beam L changes, a preferable range of the acute angle α in the image capture apparatus 100B is also different from the preferable range of the acute angle α in the image capture apparatus 100A. Specifically, in the image capture apparatus 100B, the acute angle α satisfies the following formula (2):

$$\theta_i \leq \sin^{-1}\left\{\frac{n_2}{n_1}\sin\left[\alpha - \sin^{-1}\left(\frac{n_1}{n_2}\right)\right]\right\}, \quad (2)$$

wherein $\theta_i$ is an angle of the light beam L entering the light incident surface 116B, $n_1$ is the refractive index of the environment medium 1, and 112 is the refractive index of the light guide device 110. $\theta_i$ is negative if the direction from the normal line (e.g., the dotted line illustrated in FIG. 5) of the light incident surface 116B to the light beam L is clockwise. $\theta_i$ is positive if the direction from the normal line (e.g., the dotted line illustrated in FIG. 5) of the light incident surface 116B to the light beam L is counterclockwise. The image capture apparatus 100B has effects and advantages similar to the image capture apparatus 100A and will not be repeated.

Figure 6:
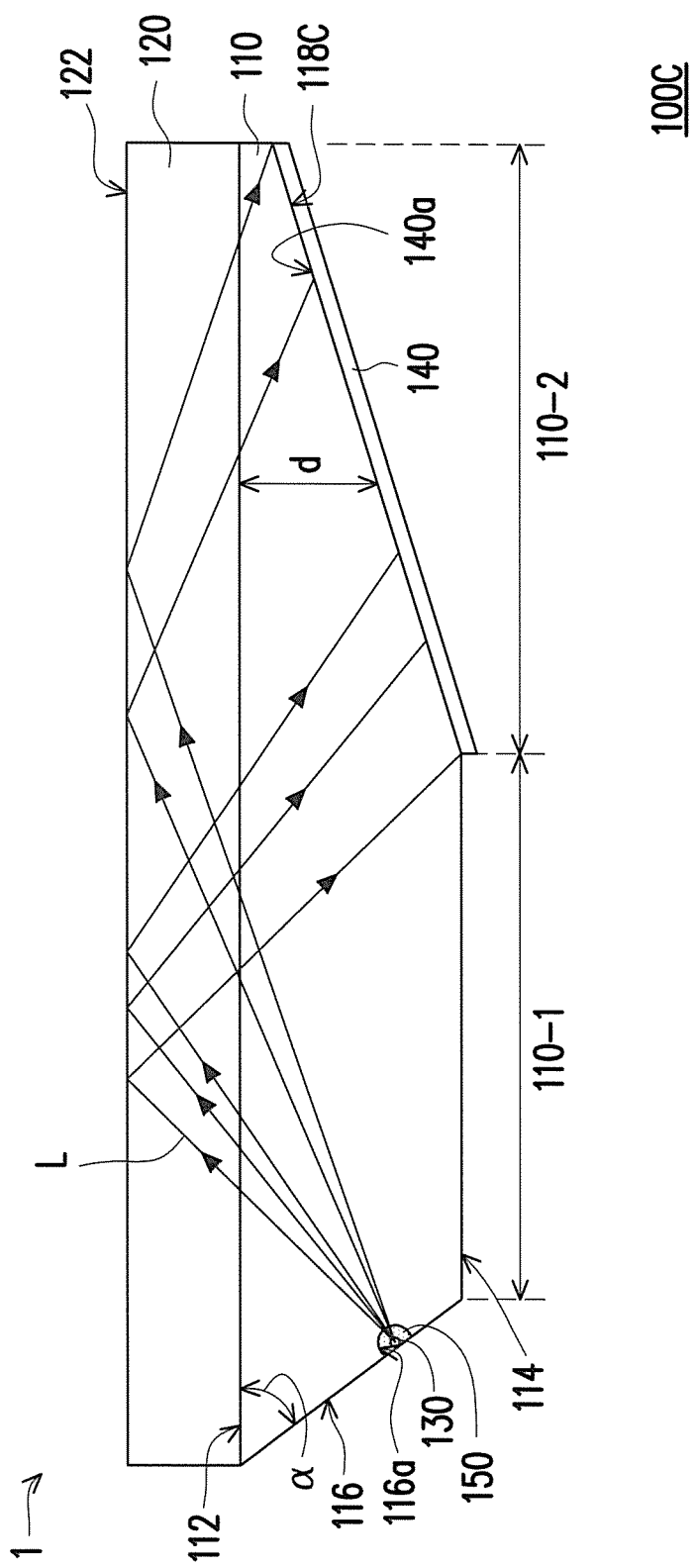
FIG. 6 is a schematic sectional view of an image capture apparatus according to still another embodiment of the invention.

FIG. 6 is a schematic sectional view of an image capture apparatus according to still another embodiment of the invention. Referring to FIG. 6, an image capture apparatus 100C of the present embodiment is similar to the image capture apparatus 100A described above, and thus, the same or corresponding elements are labeled by the same or corresponding numerals. The difference between the image capture apparatus 100C and the image capture apparatus 100A lies in that the image capture apparatus 100C may not have to include the first reflection device 160 and the second reflection device 170, and the light guide device 110 of the image capture apparatus 100C may not have to have the inner wall 113. The difference will be described below, and the same or corresponding parts may refer to the description above.

Referring to FIG. 6, the image capture apparatus 100C includes the light guide device 110, the transparent device 120, the light source 130 and the image capture device 140. The light guide device 110 includes the top surface 112, the bottom surface 114 opposite to the top surface 112, the light incident surface 116 connected between the top surface 112 and the bottom surface 114 and a light emitting surface 118C. The light emitting surface 118C is opposite to the top surface 112. The bottom surface 114 is connected between the light incident surface 116 and the light emitting surface 118C. The light emitting surface 118C is inclined with respect to the top surface 112, and a distance d between the top surface 112 and the light emitting surface 118C is gradually decreased as being far away from the light source 130. An acute angle α is included between the light incident surface 116 and the top surface 112. The transparent device 120 is disposed on the top surface 112 of the light guide device 110. The light source 130 is disposed beside the light incident surface 116 and used to emit the light beam L. The light beam L passing through the light incident surface 116 is transmitted toward the transparent device 120 and totally reflected by the interface 122 between the transparent device 120 and the environment medium 1. The image capture device 140 is disposed on the light emitting surface 118C of the light guide device 110. The image capture device 140 is supported on the light emitting surface 118C, and the light receiving surface 140a of the image capture device 140 may be substantially parallel to the light emitting surface 118C of the light guide device 110. In other words, the light receiving surface 140a of the image capture device 140 is also inclined.

Being different from that of the image capture apparatus 100A, the light guide device 110 of the image capture apparatus 100C may not have the inner wall 113, and the light emitting surface 118C of the light guide device 110 may be directly connected with the bottom surface 114.

Additionally, the image capture apparatus 100C may not have to include the first reflection device 160 and the second reflection device 170, and the light beam L passing through the light incident surface 116 may be directly transmitted toward the transparent device 120 and totally reflected by the interface 122 between the transparent device 120 and the environment medium 1. In other words, with the use of one reflection (i.e., the total reflection of the light beam L on the interface 122) and the inclined image capture device 140, the size of the image capture apparatus 100C may also be reduced while the first reflection device 160 and the second reflection device 170 do not have to be disposed.

Figure 7:
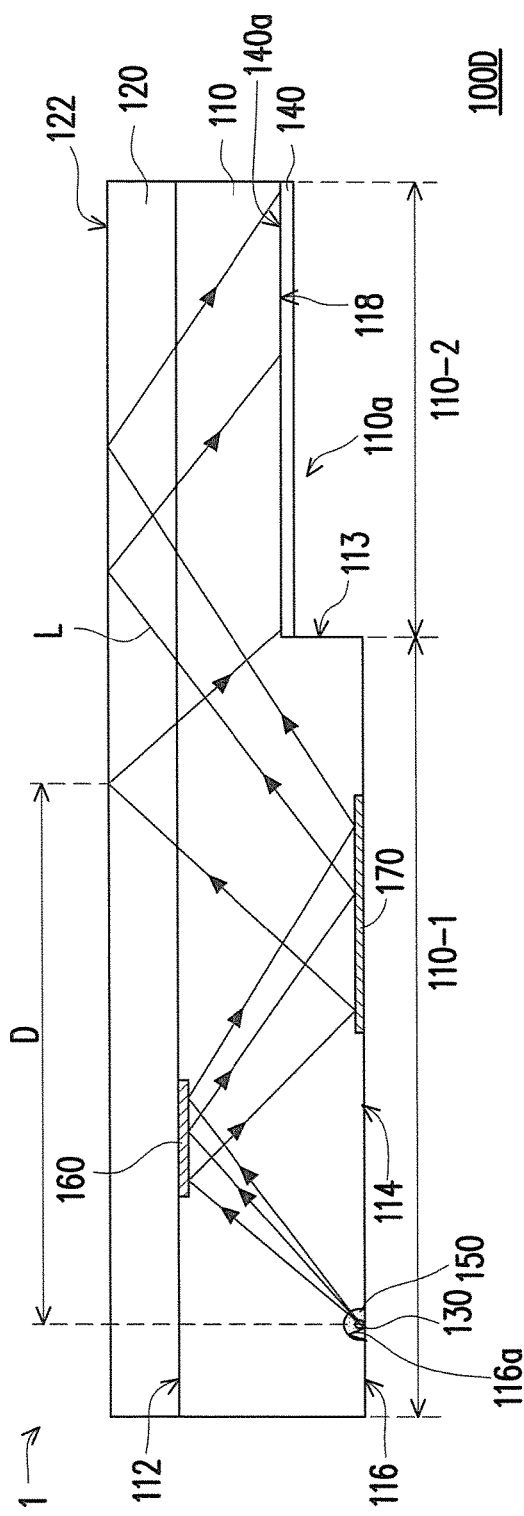
FIG. 7 is a schematic sectional view of an image capture apparatus according to an embodiment of the invention.
Figure 8:
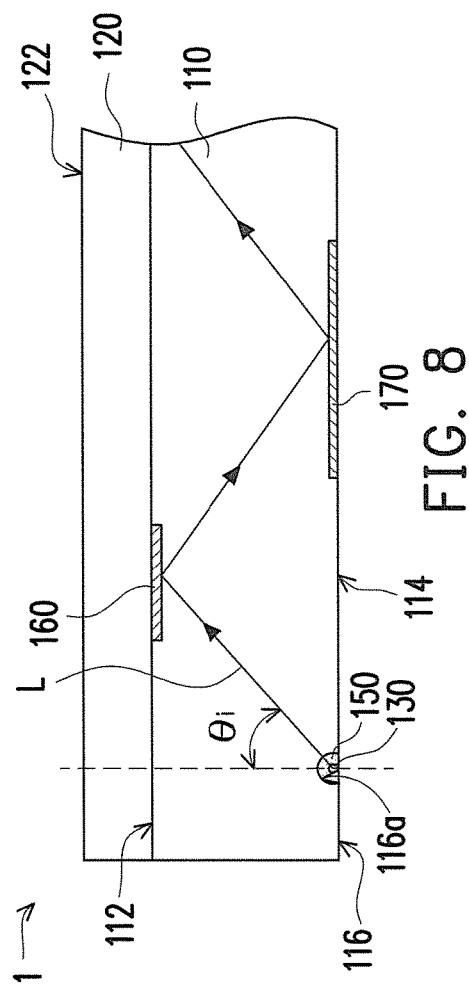
FIG. 8 is a schematic view of a part of the image capture apparatus according to an embodiment of the invention.

FIG. 7 is a schematic sectional view of an image capture apparatus according to an embodiment of the invention. FIG. 8 is a schematic view of a part of the image capture apparatus according to an embodiment of the invention. Referring to FIG. 7 and FIG. 8, an image capture apparatus 100D of the present embodiment is similar to the image capture apparatus 100 described above, and thus, the same or corresponding elements are labeled by the same or corresponding numerals. The difference between the image capture apparatus 100D and the image capture apparatus 100 lies in the light incident surface 116 of the image capture apparatus 100D being disposed on the bottom of the light guide device 110. The difference will be described below, and the same or corresponding parts may refer to the description above.

Referring to FIG. 7 and FIG. 8, the image capture apparatus 100D includes the light guide device 110, the transparent device 120, the light source 130 and the image capture device 140, the first reflection device 160 and the second reflection device 170. The light guide device 110 includes the top surface 112, the bottom surface 114 opposite to the top surface 112, the light incident surface 116 connected between the top surface 112 and the bottom surface 114 and the light emitting surface 118. The light emitting surface 118 is opposite to the top surface 112. The bottom surface 114 is connected between the light incident surface 116 and the light emitting surface 118. The transparent device 120 is disposed on the top surface 112 of the light guide device 110. The light source is used to emit the light beam L. The image capture device 140 is disposed on the light emitting surface 118 of the light guide device 110. The first reflection device 160 is disposed on the top surface 112 of the light guide device 110 and located between the transparent device 120 and the light guide device 110. The second reflection device 170 is disposed on the bottom surface 114 of the light guide device 110. The light beam L passing through the light incident surface 116 is reflected by the first reflection device 160 and the second reflection device 170. The light beam L reflected by the first reflection device 160 and the second reflection device 170 is totally reflected by the interface 122 between the transparent device 120 and the environment medium 1.

Being different from that of the image capture apparatus 100, the light incident surface 116 of the image capture apparatus 100D is disposed on the bottom of the light guide device 110. In other words, a part of the light incident surface 116 may substantially coplanar with the bottom surface 114, but the invention is not limited thereto. In the present embodiment, $\theta_i$ is an incident angle of the light beam L entering the light guide device 110 through the light incident surface 116, and $\theta_i$ satisfies the following formula (3):

$$\theta_i \leq \pi - \sin^{-1}\left(\frac{n_1}{n_2}\right), \quad (3)$$

wherein $n_1$ is the refractive index of the environment medium, and $n_2$ is the refractive index of the light guide device 110. $\theta_i$ is negative if the direction from the normal line (e.g., the dotted line illustrated in FIG. 8) of the light incident surface 116 to the light beam L is clockwise. $\theta_i$ is positive if the direction from the normal line (e.g., the dotted line illustrated in FIG. 8) of the light incident surface 116 to the light beam L is counterclockwise. The image capture apparatus 100D has effects and advantages similar to the image capture apparatus 100 and will not be repeated.

Based on the above, the image capture apparatus provided by one of the embodiments of the invention includes the light guide device, the transparent device disposed on the top surface of the light guide device, the light source disposed beside the light incident surface of the light device and the image capture device disposed on the light emitting surface of the light guide device. The light incident surface of the light guide device is inclined with respect to the top surface of the light guide device, and the acute angle α is included between the top surface and the light incident surface of the light guide device. With the inclined light incident surface (i.e., the design of the acute angle α), the light beam emitted by the light source can be totally reflected by the interface between the transparent device and the environment medium within a short distance. In this way, the size of the image capture apparatus can be reduced, which is favorable for being installed in various electronic products.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:

1. An image capture apparatus, located in an environment medium, comprising:
    a light guide device, comprising:
    a top surface;
    a bottom surface, opposite to the top surface;
    an light incident surface, connected between the top surface and the bottom surface, wherein an acute angle α is included between the light incident surface and the top surface; and
    a light emitting surface, opposite to the top surface, wherein the bottom surface is connected between the light incident surface and the light emitting surface;
    a transparent device, disposed on the top surface of the light guide device;
    a light source, used to emit a light beam, wherein the light beam passing through the light incident surface is transmitted toward the transparent device and totally reflected by an interface between the transparent device and the environment medium; and
    an image capture device, disposed on the light emitting surface of the light guide device,
    wherein the acute angle α satisfies a formula (2):

$$\theta_i \leq \sin^{-1}\left\{\frac{n_2}{n_1}\sin\left[\alpha - \sin^{-1}\left(\frac{n_1}{n_2}\right)\right]\right\}, \quad (2)$$

wherein $\theta_i$ is an incident angle of the light beam entering the light incident surface, $n_1$ is a refractive index of the environment medium, and $n_2$ is a refractive index of the light guide device.

2. The image capture apparatus according to claim 1, wherein the light source is disposed outside the light guide device and located in the environment medium, and wherein refractive indices of the light guide device and the transparent device are the same.

3. The image capture apparatus according to claim 1, further comprising:
 a first reflection device, disposed on the top surface of the light guide device and located between the transparent device and the light guide device; and
 a second reflection device, disposed on the bottom surface of the light guide device, wherein the light beam passing through the light incident surface is sequentially reflected by the first reflection device and the second reflection device and expanded, the expanded light beam is totally reflected by the interface between the transparent device and the environment medium, and the image capture device is disposed more adjacently to the transparent device than the second reflection device.

4. The image capture apparatus according to claim 3, wherein the light guide device further comprises:
 an inner wall, wherein the light emitting surface is more adjacent to the transparent device than the bottom surface, the inner wall is connected between the bottom surface and the light emitting surface, a recess is formed by the inner wall and the light emitting surface, and the image capture device is disposed in the recess.

5. The image capture apparatus according to claim 3, wherein the image capture device has a light receiving surface facing the light emitting surface, and the light receiving surface and the light emitting surface are inclined with respect to the top surface.

6. The image capture apparatus according to claim 1, wherein the image capture device has a light receiving surface facing the light emitting surface, and the light receiving surface and the light emitting surface are inclined with respect to the top surface.

7. The image capture apparatus according to claim 1, wherein the light beam is invisible light.

8. An image capture apparatus, located in an environment medium, comprising:
 a light guide device, comprising:
 a top surface;
 a bottom surface, opposite to the top surface;
 a light incident surface, connected between the top surface and the bottom surface; and
 a light emitting surface, opposite to the top surface, wherein the bottom surface is connected between the light incident surface and the light emitting surface;
 a transparent device, disposed on the top surface of the light guide device;
 a light source, used to emit a light beam;
 an image capture device, disposed on the light emitting surface of the light guide device;
 a first reflection device, disposed on the top surface of the light guide device and located between the transparent device and the light guide device; and
 a second reflection device, disposed on the bottom surface of the light guide device, wherein the light beam passing through the light incident surface is sequentially reflected by the first reflection device and the second reflection device and expanded, the light beam reflected by the first reflection device and the second reflection device is totally reflected by an interface between the transparent device and the environment medium, and the image capture device is disposed more adjacently to the transparent device than the second reflection device.

9. The image capture apparatus according to claim 8, wherein the light guide device further comprises:
 an inner wall, wherein the light emitting surface is more adjacent to the transparent device than the bottom surface, the inner wall is connected between the bottom surface and the light emitting surface, a recess is formed by the inner wall and the light emitting surface, and the image capture device is disposed in the recess.

10. The image capture apparatus according to claim 8, wherein $\theta_i$ is an incident angle of the light beam entering the light guide device through the light incident surface, and $\theta_i$ satisfies a formula (3):

$$\theta_i \leq \pi - \sin^{-1}\left(\frac{n_1}{n_2}\right), \qquad (3)$$

wherein $n_1$ is a refractive index of the environment medium, and $n_2$ is a refractive index of the light guide device.

11. The image capture apparatus according to claim 8, wherein the image capture device has a light receiving surface facing the light emitting surface, and the light receiving surface and the light emitting surface are inclined with respect to the top surface.

12. The image capture apparatus according to claim 8, wherein the light beam is invisible light.

\* \* \* \* \*